(12) United States Patent
Abrams et al.

(10) Patent No.: US 6,724,732 B1
(45) Date of Patent: Apr. 20, 2004

(54) DYNAMIC ADJUSTMENT OF TIMERS IN A COMMUNICATION NETWORK

(75) Inventors: Robert J. Abrams, Naperville, IL (US); Young-Fu Chang, Buffalo Grove, IL (US); Jaap T. Erne, Zeewolde (NL); Stuart M. Garland, Morton Grove, IL (US); John A. Johnson, Wheaton, IL (US); Richard A. Kamieniecki, Naperville, IL (US); Chinmei C. Lee, Woodridge, IL (US); Francis J. Pope, Naperville, IL (US); Marilyn A. Wouda, Chicago, IL (US); ZhongJin Yang, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/225,911

(22) Filed: Jan. 5, 1999

(51) Int. Cl.$^7$ ................................................ G01R 31/08
(52) U.S. Cl. ..................... 370/252; 370/508; 370/519
(58) Field of Search ................................. 370/229, 231, 370/232, 233, 234, 238, 252, 289, 395.1, 519, 508

(56) References Cited

U.S. PATENT DOCUMENTS

| | | | | |
|---|---|---|---|---|
| 5,245,634 A | * | 9/1993 | Averbuch | 375/108 |
| 5,280,629 A | * | 1/1994 | Lo Galbo et al. | 455/51.2 |
| 5,958,060 A | * | 9/1999 | Premerlani | 713/400 |
| 6,246,702 B1 | * | 6/2001 | Fellman et al. | 370/503 |
| 6,405,337 B1 | * | 6/2002 | Grohn et al. | 714/749 |

* cited by examiner

*Primary Examiner*—Alpus H. Hsu
*Assistant Examiner*—T Tran

(57) ABSTRACT

Computers that exchange data over communication networks frequently wait for responses to messages and therefor use timers to control the amount of time that the computer will wait for a response to a command issued over a network. Communication network responsiveness varies as traffic loading on the network changes. Fixed-value timers that don't take network loading into account can inadvertently terminate communications if a response is not timely received. Varying or adjusting data communication timers according to data network responsiveness can prevent erroneous data communication session termination.

1 Claim, 1 Drawing Sheet

DYNAMIC ADJUSTMENT OF TIMERS IN A COMMUNICATION NETWORK

TECHNICAL FIELD OF THE INVENTION

This invention relates to communication networks. In particular this invention relates to methods and devices that monitor data network responsiveness and act to limit adverse effects of a data or communication network overload.

BACKGROUND OF THE INVENTION

In data communication networks like the internet, there are time delays between the issuance of a command or data packet from one computer and the receipt of a response to the command or responsive data packet from another computer in the network. Logging onto a web site for instance typically causes the data files that comprise images of the web site to be sent from one computer to another.

Inter-computer communications in a data network comprise commands and data packets, among other things, issued by one computer addressed to one or more other computers. When a command, or data packet response is received by a computer to which it is addressed, the addressed computer typically issues a response to the computer issuing the command in some way. In the case of one computer "logging on" to a web site computer for example, what actually happens is that a host computer that stores files comprising the web site, sends a file or files to a client computer. When the client receives the file or files from the host, the client displays the web site content. To access (or log onto) a web site it can be said that the client issues a command to the host, which responds by sending data files to the client.

In all data communications networks there is a measurable time between issuance of any command by a computer and the receipt of a response to the command from another computer.

The delay between a command and a response is a function of several factors including network traffic load, traversed network node capacity, data transmission rates, communication link design, electrical and physical distance between computers and the number of data network users. In general, delay time is inversely proportional to the amount of data that the network is tasked to handle. Stated alternatively, as the number of data network users increases, and as the amount of data through a network increases, the more time it will take the network to process all of the data exchanges.

In many instances, delays between issuance of a command or data packet and receipt of a response thereto can become so great that a computer waiting for a response will adversely affect other processes dependent upon the computer that is waiting for a response. Many computers will use timers to set an upper limit on the amount of time that a computer will wait for a response to a command. Using a timer prevents a computer from effectively locking up and impeding other processing tasks. If a response to a command is not received when the time-out timer expires, the computer can ignore the process that was waiting for a response, which might never come.

Using a time-out timer in a data communications network has some limitations however. Many times a data network becomes so overloaded with traffic that virtually all communication transactions thereon require long times to complete. Fixed-value timers do not take operational software differences or transmission network difference into account and can expire before any communications transactions are completed. A method and apparatus for use of a computer in a data network that reduces time-out communications failures, which in turn cause communications delays on a varying basis would be an improvement over the prior art.

SUMMARY OF THE INVENTION

In a data communications network, including packet networks using packet data communications protocols, packet delay timers are used in network computers to prevent a computer from waiting for unnecessarily long times for a response. The invention disclosed herein dynamically re-sets so-called watch-dog or time-out timers which helps insure that a computer not become locked up waiting indefinitely for a response but prevents a computer from pre-maturely aborting communications sessions that require more time.

The improved method measures the time required to receive a response to a command over a data communications network to obtain a first round trip delay time. This actual round-trip delay time for a response to come back from a command, a data packet or a message fragment is compared periodically to some baseline expected round trip delay time value to yield a round trip delay time difference. If the measured round-trip delay time differs from the expected baseline value by a pre-defined amount, the baseline expected value is adjusted, up or down by some predetermined incremental amount to yield a new baseline value. The newly calculated baseline round-trip delay time is thereafter used to determine the time that the computer will wait for responses.

Dynamically adjusting time-out timers in a communication network helps insure that the maximum communication session wait time reflects actual network conditions. As the actual round-trip delay times change, they are used to adjust the baseline value by an incremental amount. The newly calculated round-trip delay time is used to limit the maximum length of time that a computer will wait for responses to commands or packets it issues. Re-calculating timer values based upon actual delay time experience reflecting actual network responsiveness avoids rigid application of a fixed timer value which might abort communications if network responsiveness falls for any reason. Network sluggishness, increased network path length, increased network traffic load or other network-originated delays can unexpectedly increase response delays. During heavy traffic periods, network delays might become so lengthy that virtually every communication session might be aborted using fixed time-out values.

The recalculated timer values can automatically be implemented in a switching system software such as the Lucent Technologies No. 5 ESS™.

DETAILED DESCRIPTION OF THE PREFERRED EMBODIMENT

Figure 1:
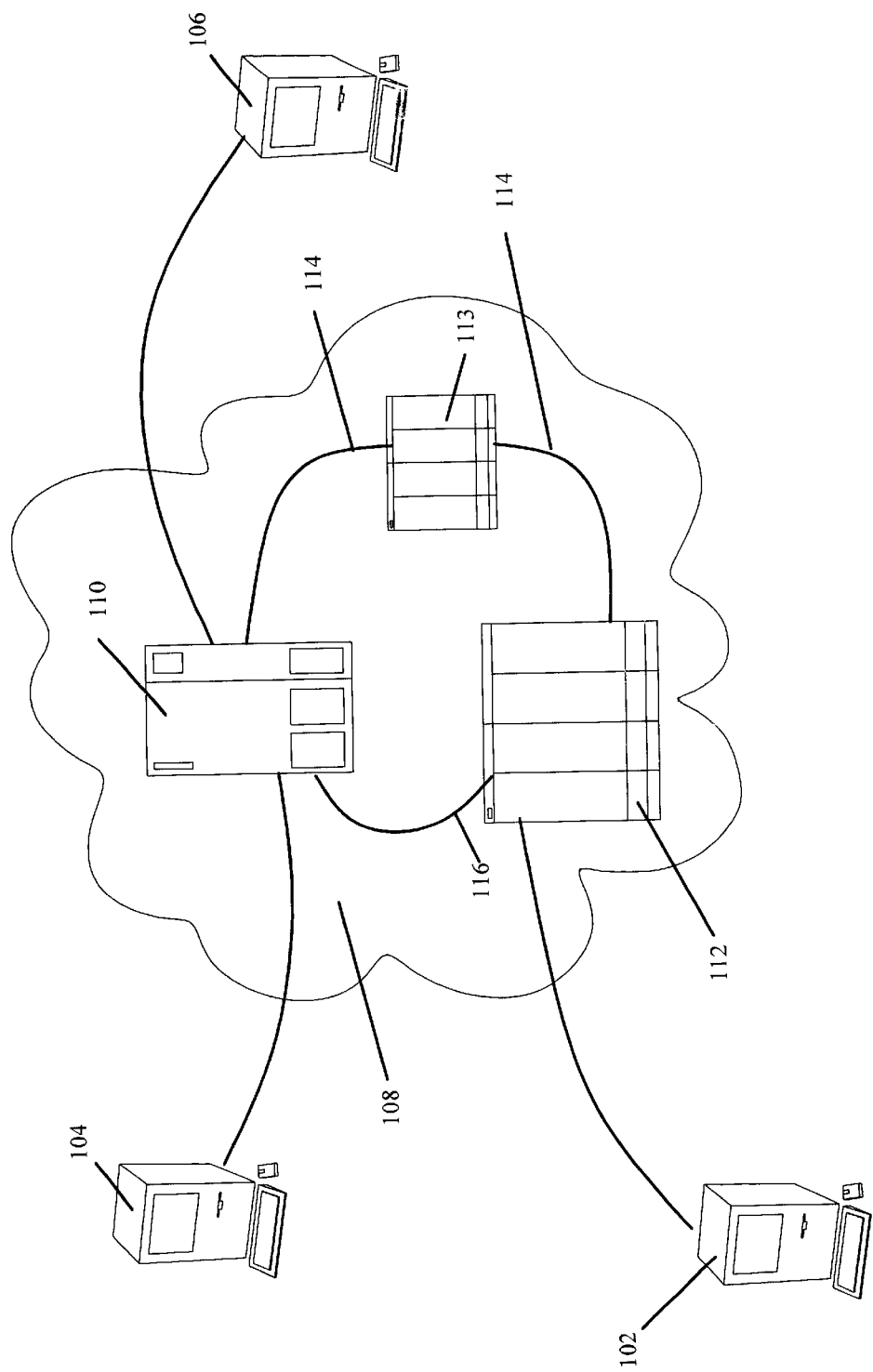
FIG. 1 shows a simplified block diagram of a data communications network contemplated by the invention.

FIG. 1 shows a simplified block diagram of a data communications network comprised of three client computers 102, 104, 106 coupled to the internet 108, which as shown is comprised of three server computers 110, 112 and 113. The client and server computers both might include single-user personal computers or work stations but might also include data switches or switching systems, as those skilled in the art will recognize. The server computers 110, 112 and 113 are coupled together through some appropriate media 114, 116 so that the servers 110, 112 and 113 can communicate with each other. The data carried between computers might include synchronous data, asynchronous data, isochronous (synchronous transmission within an asynchronous frame) and packet data, which might be carried over a variety of pathways including but not limited to, wire, microwave radio or optical fiber. The client computers 102, 104 and 106 are coupled to the server computers 110, 112, 113 through media that would in part be comprised of one or more switching systems such as Lucent Technologies No. 5 ESS switching system or other switching system (not shown) including for instance ATM (asynchronous transfer mode) switches and also including optical switching systems as well.

Each of the computers shown 102, 104, 106, 110, 112 and 113 carry communications to and from each other. As is shown in FIG. 1, the client computers 102, 104, and 106 do not communicate directly with each other in command-response transactions nor do the server computers 110, 112, and 114 communicate with each other in command-response transactions. In the course of exchanging data, one of the computers will issue a command or other output requiring or causing a response to be generated by another computer.

The time required for one computer to issue a command and for some other to issue a response thereto will normally be some expected amount. The expected amount of time to exchange messages between the computers 102, 104, 106, 110, 112 and 113 will depend upon the transmission path length, network congestion, CPU operating speed, or the necessity of message retries due to poor signal quality. Path length delay time is usually affected by the physical path length, i.e. geographic distance between the network computers as well as the number of intervening nodes through which a message passes. The command-response time of a physically longer path 114 will usually be longer than the command-response time of physically shorter path 116 if all other elements of the paths are identical. In some instances however, one path (114 through computer 113 for instance) might be physically longer than another path (116) yet have a shorter response time between computers 110 and 112 if the equipment or transmission technology used in the shorter path (116) is slower than that used on the physically longer path (114).

It is well known that propagation delay along any transmission line increases as the transmission line length increases. It is also well known that as data is routed through intermediate connection nodes and switches, transmission delay times also increase. Asynchronous data can sometimes be queued in one or more asynchronous transfer mode switches, adversely affecting delay time.

By way of example, if computer 102 wishes to receive a file or files from a distant computer 104, the first computer will request a copy of the pertinent files from the distant computer. The data request traverses the internet 108 in some well-known fashion, including but not limited to synchronous data over the public switched telephone network, asynchronous transfer mode through a proprietary data network, or other network. Regardless of the data architecture or data communications protocol or format, some time will always be required to exchange data between the two computers.

At least some of the computers of the network shown in FIG. 1 employ communication time-out timers, sometimes referred to as watch dog timers, the expiration of which tells the computer that too much time has elapsed for a communication transaction. Upon the expiration of the time out timer, the communication will be aborted if an expected response to a previous message has not been received. Aborting the communication is done on the assumption that the other computer from which a response is awaited is either failed, out of service, or otherwise inaccessible because a response was not timely received.

As set forth above, as the amount of data being carried through the internet 108 increases, the computers comprising the internet 110, 112, 113 require more and more time to respond to each data transaction. Alternatively, data transmissions might be routed along a different path, from 116 to 114 for instance changing propagation delay time. As the amount of transaction response time increases, communication time out timer expiration becomes more commonplace and in many instances, communications sessions are prematurely terminated.

Within each computer using a communication time out timer, there is a timer initialized with a baseline time out value. Such a timer might be a hardware device such as a counter timer chip or even a suitably programmed microprocessor the only function of which is to calculate elapsed times. Alternatively, communication time-out timers might be implemented entirely in software executed on one or more processors of the computers shown in FIG. 1.

Expiration of a communication time-out timer prevents a computer from waiting beyond an acceptable length of time for an expected response. Dynamically adjusting communication time-out timers allows the computers 102, 104, 106, 110, 112 and 113 to continue to communicate but without the risk that one or more of them will become lost to other tasks because of intolerably long communication delay times on the network. The method of the invention still retains timer limits beyond which a computer will not wait so as to insure some limit on the time that a computer will wait for a response. Baseline timer values are not adjusted without limit; user specified upper and lower values of the timer insures that the timer re-calculation does not undo the purpose of the communication response timer.

The baseline timer value used to decide when to abort a data communication session is adjusted to reflect actual communication network conditions. It is well known that data network responsiveness varies with network loading or use. At times when a network is heavily loaded, the network will require more time to process data communications between computers. At times when network response time is long, fixed-value time-out timers that are used to prevent a computer from waiting too long for a response to a communication request might prematurely abort data communications. Varying the baseline timer value according to network conditions allows at least some communications to occur.

The baseline timer value is set to a value which is used to determine how long a computer should wait for a response to a command or data message (or data packet) sent to a destination. The value to which the baseline timer value is set will usually reflect experience and/or historical performance of the data network.

Four different categories of round-trip time delay factors are employed the baseline timer value. The first category of round-trip time delay factors reflects variations in actual round-trip delay time and will vary with network loading. First, the actual round-trip delay time of a message or data packet transmission is measured. This actual round-trip delay time is compared to the baseline timer value. An adjustment factor is derived from the difference between the baseline timer value and the actual round-trip delay time. The adjustment factor need not be exactly equal to the difference between the actual round-trip delay time and the baseline timer values but might be a fractional part thereof so as to more slowly adjust the baseline value according to actual network conditions.

In the preferred embodiment of the invention, the amount of time that the baseline timer value can be adjusted is limited. The maximum and minimum baseline timer values should reflect the allowable round-trip delay time. Adjusting the baseline value to be too short, for example during periods when network use is low, might adversely affect data communications when network loading increases. If the maximum and minimum baseline timer values are not exceeded, the baseline timer value is re-calculated based on the actual round-trip delay time to reflect actual delay time experience. In addition, actual network conditions are taken into account when determining baseline timer values.

The second category of round-trip time delay factors is based upon the number of time zones traversed by a message packet. The number of time zones traversed is compared to determine, in part, an estimate of the geographic distance a message might travel before being answered. The number of traversed time zones is used to add or subtract a baseline time factor. The baseline time factor is used to adjusts the baseline timer value. The baseline time factor can be based upon the actual round-trip delay time or upon a relative round-trip delay time to completion time.

The third category of round-trip delay factors used to adjust delay time is the time of day. The maximum allowable round trip delay time for a message may vary based upon the time of day. For example, a short round-trip message delay time might be more important during business hours. If computers are identified by geographically significant addresses, consulting a database of such addresses that can be correlated to time zones, it might be possible to adjust message time out timers based upon the time of day. The baseline timer value can be adjusted based upon the time of day when a message is sent.

The fourth category of round-trip time delay factors is based on network use. Some nodes of a data network might be more congested with data to transfer than others thereby increasing message propagation delay time. A database of internet nodes and the nominal message routing delay expected from such nodes might be used to calculate an expected response time delay and to recalculate or replace the nominal message delay time.

By adjusting the allowable response delay time for a message in a data network, a computer can be prevented from unnecessarily waiting too long for responses to messages. On the other hand, data and communications are less likely to be prematurely aborted and lost when network conditions, time of day, geographic distances and other reasons require more time for data to traverse a network.

Other embodiments of the invention would include delay timer adjustment based upon the identity of particular internet nodes. For example, some nodes or web sites might be particularly popular with internet users for a variety of reasons and all other factors being equal, perhaps therefor inherently less responsive. Delay timers of a computer accessing such a site might preferably be adjusted on the basis of the internet node domain name or address. Certain high-traffic and/or slow response time internet nodes identities might be cataloged in a database or table of such nodes. Alternatively, a data base or table might be used to record message delay timer values for previously accessed nodes. Reading data from a data base file or a data table is well known prior art.

Closely related to the accessibility of popular web sites or internet nodes is the time of day that nodes are accessed. Certain nodes might be more frequently accessed during certain times of the day. Accordingly, an alternate embodiment contemplates adjusting time-out timer values heuristically, based at least in part upon the local time of day.

Time-out timers that are adjusted based upon the time of day might also be adjusted based upon the time zone that the particular computer is in with respect to the time zone of the internet node being accessed. For example, if a first computer that provides internet node service is on one side of the globe, and if a second computer accessing the first computer is on the opposite side of the globe, using the method disclosed above, the two computers might calculate different delay times because of the anticipated node loading simply because of the time zones differences in which the two computers reside. Accordingly, another alternate embodiment of the invention contemplates adjusting delay timers based upon the particular time zones of computers accessing internet nodes and of computers providing internet access and of the number of time zones between computers communicating with each other.

Of course, a computer in one time zone accessing a computer in another time zone would need to determine the time zone difference. Such a determination might be made by way of a message from one computer to the other, however, such an inquiry would itself be subject to the propagation delay between the two machines. At least one alternative method for determining time zone differences would be to use the internet address as an index to a table listing of time zones for particular internet addresses.

Those skilled in the art will recognize that the invention disclosed herein is readily applicable to asynchronous transfer mode (ATM) networks. The invention might also be useful with other networks including but not limited to frame relay networks or other data packet transmission schemes. Those skilled in the art will also recognize that the invention disclosed herein might also be useful with synchronous networks as well.

What is claimed is:

1. In a packet data communications network using data packet communications protocols, a method for dynamically adjusting inter-data packet delay time timers comprising the steps of:

a. initially measuring a time required to receive a response to a command over said packet data communications network in order to obtain a first round trip delay time;

b. comparing said first round trip delay time to a first baseline expected round trip delay time value yielding a first round trip delay time difference, wherein said first baseline is based on a historical experience of said packet data communications network;

c. thereafter adjusting said first baseline expected round trip delay time value according to an adjustment factor, which is based on said first round trip delay time difference thereby dynamically adjusting said inter-data packet delay time timers, which vary with network loading; and d. limiting said adjustment factor of said first baseline expected round trip delay time between first and second round trip delay time limits, wherein said adjustment factor is based on a fractional part thereof in order to slowly adjust said first baseline value and subsequent baseline values thereof according to actual network conditions.

* * * * *